US012680561B2

(12) United States Patent
Tada et al.

(10) Patent No.: US 12,680,561 B2
(45) Date of Patent: Jul. 14, 2026

(54) SCREW FASTENING STRUCTURE AND COMPONENT FOR VEHICLE

(71) Applicant: STANLEY ELECTRIC CO., LTD., Tokyo (JP)

(72) Inventors: Ryota Tada, Tokyo (JP); Toshiharu Ajisaka, Tokyo (JP); Kazuma Kamioka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 296 days.

(21) Appl. No.: 18/521,293

(22) Filed: Nov. 28, 2023

(65) Prior Publication Data

US 2025/0154973 A1      May 15, 2025

(30) Foreign Application Priority Data

Nov. 14, 2023 (JP) ................................. 2023-193621

(51) Int. Cl.
*F16B 5/02*        (2006.01)
*F16B 5/00*        (2006.01)
(Continued)

(52) U.S. Cl.
CPC .............. *F16B 5/02* (2013.01); *F16B 5/0096* (2013.01); *F16B 17/00* (2013.01); *F16B 39/22* (2013.01);
(Continued)

(58) Field of Classification Search
CPC ........ F16B 5/0096; F16B 5/02; F16B 5/0208; F16B 17/00; F16B 17/006; F16B 17/008;
(Continued)

(56) References Cited

U.S. PATENT DOCUMENTS 3,544,143 A * 12/1970 Ohlsson ............ B29C 66/81431
                                                        403/274
7,070,378 B2 * 7/2006 Grabowski ......... F16B 19/1027
                                                        411/501
(Continued)

FOREIGN PATENT DOCUMENTS

FR          1254029 A  *  2/1961   .............. F16B 39/34
JP          5501906 B      5/2014
(Continued)

*Primary Examiner* — Josh Skroupa
(74) *Attorney, Agent, or Firm* — Kenealy Vaidya LLP

(57) ABSTRACT

A screw fastening structure that fastens at least a first member and a second member using screw, the first member includes a boss protruding toward the second member and a screw hole through which a screw is screwed on a tip of the boss, the second member includes a through-hole through which the boss passes, a cylindrical part protruding from a periphery of the through-hole over the entire circumference, and a plurality of projection portions disposed on a tip side of the cylindrical part in a circumferential direction and protruding further than the tip of the boss passing through the through-hole, and when the screw is screwed into the screw hole and the head portion of the screw abuts the tip of the boss, a head portion of the screw is fastened in a state in which the tip sides of the plurality of projection portions are crushed.

9 Claims, 3 Drawing Sheets

(51) Int. Cl.
     F16B 17/00        (2006.01)
     F16B 39/22        (2006.01)
     F21S 41/29        (2018.01)

(52) U.S. Cl.
     CPC ......... F21S 41/29 (2018.01); *Y10T 403/4949*
           (2015.01); *Y10T 403/4966* (2015.01); *Y10T*
                           *403/75* (2015.01)

(58) Field of Classification Search
     CPC .......... F16B 39/01; F16B 39/22; F16B 39/28;
             F16B 39/284; F16B 39/34; F21S 41/19;
             F21S 41/29; F21S 41/47; F21S 41/55;
             Y10T 403/49; Y10T 403/4949; Y10T
          403/4966; Y10T 403/68; Y10T 403/7073;
               Y10T 403/7092; Y10T 403/75
     USPC ..... 403/274, 280, 282, 343, 375, 380, 408.1
     See application file for complete search history.

(56) References Cited

U.S. PATENT DOCUMENTS

| | | | | |
|---|---|---|---|---|
| 9,067,625 B2 * | 6/2015 | Morris | ................... | F16B 5/0056 |
| 9,303,667 B2 * | 4/2016 | Morris | ...................... | F16B 5/00 |
| 9,463,831 B2 * | 10/2016 | Morris | ................. | B62D 27/065 |
| 11,371,544 B2 * | 6/2022 | Slater | ................... | F16B 41/002 |
| 2022/0034345 A1 * | 2/2022 | Campbell | ............. | F16B 5/0096 |

FOREIGN PATENT DOCUMENTS

| | | | | | |
|---|---|---|---|---|---|
| JP | 2018037274 A | * | 3/2018 | .............. | F21S 41/00 |
| JP | 2020004665 A | * | 1/2020 | .............. | F21V 17/00 |

* cited by examiner

<u>1</u>

SCREW FASTENING STRUCTURE AND COMPONENT FOR VEHICLE

CROSS-REFERENCE TO RELATED APPLICATION

Priority is claimed on Japanese Patent Application No. 2023-193621, filed Nov. 14, 2023, the content of which is incorporated herein by reference.

BACKGROUND OF THE INVENTION

Field of the Invention

The present invention relates to a screw fastening structure and a component for a vehicle.

Description of Related Art

For example, a lighting tool for a vehicle mounted in a vehicle has a structure in which a component for a vehicle such as a light source, an inner lens, a reflector, an extension, or the like, is disposed inside a lighting body constituted by a housing, a front surface of which is open, and a cover lens (outer lens) configured to cover an opening of the housing.

Incidentally, when the above-mentioned component for a vehicle is attached to an inner side of the lighting body, a fixing means such as a screw or the like is required. In addition, one member and another member that constitute the component for a vehicle are fixed by fastening a screw.

However, in a screw fastening structure, with the passage of time, the fastening force of the screw decreases and rattling may occur between the one member and the other member. For this reason, efforts are being made to increase the fastening force of the screw (for example, see Japanese Unexamined Patent Application, First Publication No. 2018-37274, and Japanese Patent No. 5501906).

For example, Japanese Unexamined Patent Application, First Publication No. 2018-37274 discloses a lighting tool for a vehicle in which a lamp unit having a light source is disposed in a lighting tool outer box constituted by a lamp housing having at least one opening and a cover configured to cover the opening of the lamp housing, the lamp unit includes a base body, a first optical body, and a second optical body, screw stopping parts fixed to the base body by screws are provided on each of the first optical body and the second optical body, the first optical body and the second optical body are attached to the base body through fastening using the screws in a state in which the screw stopping parts overlap, a crushing protrusion part crushed by a pressing force applied from the second optical body upon fastening is provided on the first optical body, an abutting part pressed against the base body upon fastening is provided on the first optical body, and a contact part pressed against the base body in a state in which the crushing protrusion part is crushed upon fastening is provided on the second optical body.

Meanwhile, Japanese Patent No. 5501906 discloses a configuration in which a plurality of convex portions are provided around a screw passage hole, and the plurality of convex portions come into contact with a head portion of a screw to be crushed when the screw is inserted into a screw passage hole and screwed into a screw receiving portion.

SUMMARY OF THE INVENTION

Incidentally, in the above-mentioned screw fastening structure in the related art, a fastening force of a screw immediately after fastening can be increased by collapsing (crushing) a protrusion (convex portion). Meanwhile, since the entire protrusion (convex portion) is collapsed (crushed), the elasticity of the protrusion (convex portion) disappears and the repulsive force is lost due to the plastic deformation of the protrusion (convex portion). For this reason, there is a concern that the fastening force of the screw will decrease over time due to high temperature/low temperature cycles, occurrence of creep (stress relief), or the like, resulting in rattling.

An aspect of the present invention provides a screw fastening structure capable of maintaining a fastening force of a screw for a long time, and a component for a vehicle including such a fastening structure.

An aspect of the present invention provides the following configurations.

(1) A screw fastening structure configured to fasten at least a first member and a second member using a screw,
    wherein the first member includes a boss protruding toward the second member and a screw hole into which the screw is screwed on a tip of the boss,
    the second member includes a through-hole through which the boss passes, a cylindrical part protruding from a periphery of the through-hole over the entire circumference, and a plurality of projection portions disposed on a tip side of the cylindrical part in a circumferential direction and protruding further than the tip of the boss passing through the through-hole, and
    when the screw is screwed into the screw hole and the head portion of the screw abuts the tip of the boss, a head portion of the screw is fastened in a state in which the tip sides of the plurality of projection portions are crushed.

(2) The screw fastening structure according to the above-mentioned (1), wherein, upon fastening of the screw, at least the tip side of the projection portion is plastically deformed, and the cylindrical part is elastically deformed.

(3) The screw fastening structure according to the above-mentioned (1), wherein the plurality of projection portions are disposed having intervals in a circumferential direction of the cylindrical part.

(4) The screw fastening structure according to the above-mentioned (1), wherein the projection portion has a shape pointed toward a tip thereof.

(5) The screw fastening structure according to the above-mentioned (4), wherein the projection portion has a tip surface that abuts with the head portion of the screw, and a pair of inclined surfaces inclined from both sides of the tip surface toward the tip of the cylindrical part.

(6) The screw fastening structure according to the above-mentioned (1), wherein three projection portions are disposed in the circumferential direction of the cylindrical part as the plurality of projection portions.

(7) The screw fastening structure according to the above-mentioned (1), wherein the first member is formed of a material having a yield point higher than that of the second member.

(8) The screw fastening structure according to the above-mentioned (7), wherein the first member is formed of a metal material, and the second member is formed of a resin material.

(9) A component for a vehicle including the screw fastening structure according to any one of the above-mentioned (1) to (8).

According to the aspects of the present invention, it is possible to provide a screw fastening structure capable of maintaining a fastening force of a screw for a long time, and a component for a vehicle including such a fastening structure.

DETAILED DESCRIPTION OF THE INVENTION

Figure 1:
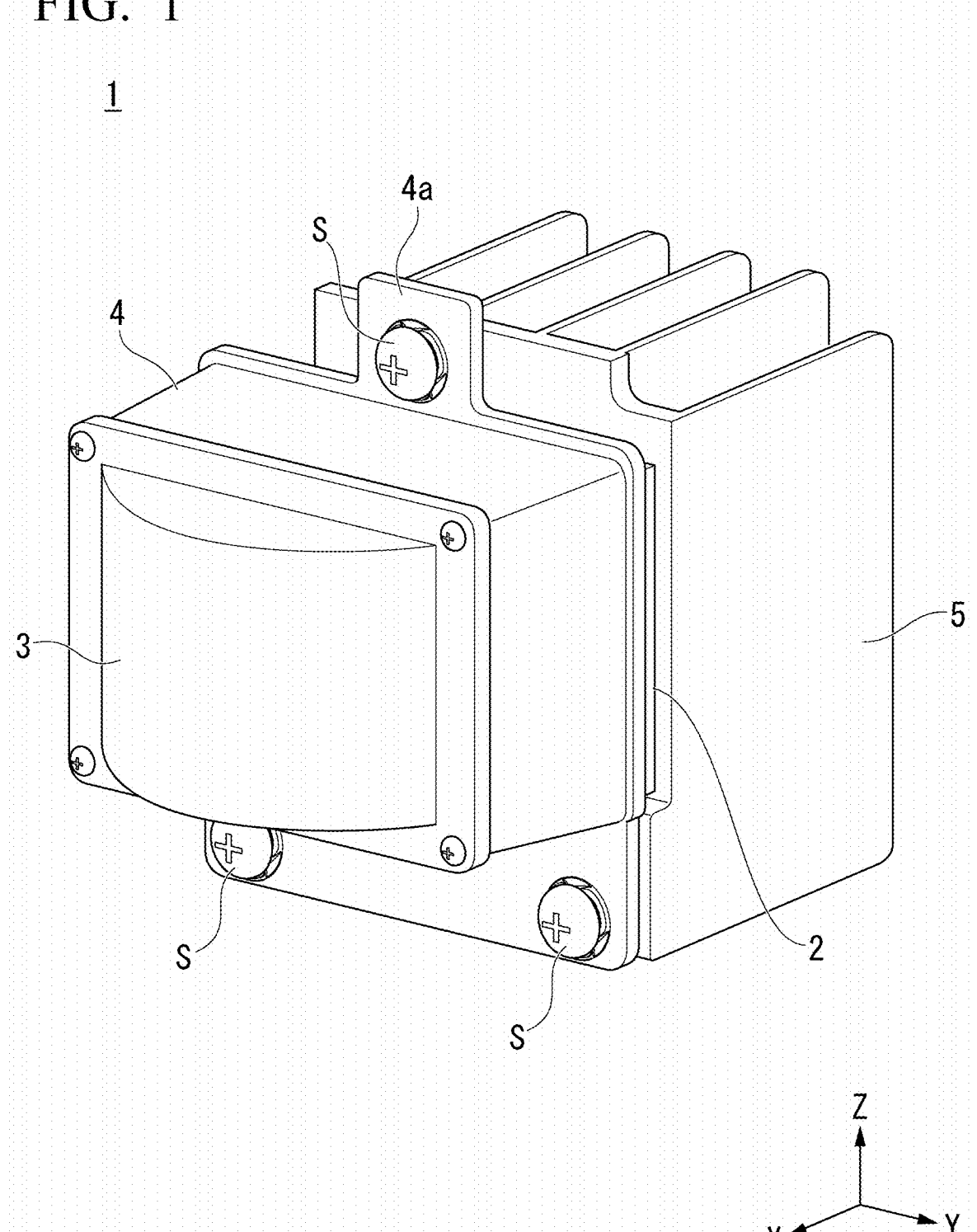
FIG. 1 is a perspective view showing a component for a vehicle according to an embodiment of the present invention.

Hereinafter, an embodiment of the present invention will be described in detail with reference to the accompanying drawings.

Further, in the drawings used in the following description, in order to make each component easier to see, dimensions may be shown at different scales depending on the component, and a dimensional ratio or the like of each component may not be the same as in reality.

As the embodiment of the present invention, for example, a screw fastening structure provided in a component for a vehicle 1 shown in FIG. 1 to FIG. 3 will be described.

Further, FIG. 1 is a perspective view showing the component for a vehicle 1. FIG. 2 is a perspective view showing a state before a screw S is fastened in the screw fastening structure provided in the component for a vehicle 1. FIG. 3 is a side view showing a state in which the screw S is fastened in the screw fastening structure.

In addition, in the drawings shown below, an XYZ orthogonal coordinate system is set, an X-axis direction is expressed as a forward/rearward direction (lengthwise direction) of the component for a vehicle 1, a Y-axis direction is expressed as a leftward/rightward direction (widthwise direction) of the component for a vehicle 1, and a Z-axis direction is expressed as an upward/downward direction (height direction) of the component for a vehicle 1.

As shown in FIG. 1, the component for a vehicle 1 of the embodiment is a component in which the screw fastening structure of the present invention is applied to a lamp unit that radiates light forward from a vehicle.

Specifically, the component for a vehicle 1 includes a circuit board 2 on which a light source (not shown) is mounted on a front surface side, a lens 3 disposed on a front surface side of the light source, a lens holder 4 configured to hold the lens 3, and a heat sink 5 attached to a back surface side of the circuit board 2.

The screw fastening structure of the embodiment is a structure configured to fasten the heat sink 5 that is a first member and the lens holder 4 that is a second member using the plurality of (in the embodiment, three) screws S.

In the embodiment, the lens holder 4 is formed of, for example, a resin material such as a polycarbonate or the like. Meanwhile, the heat sink 5 is formed of, for example, a metal material such as aluminum or the like.

Further, the screw fastening structures of the embodiment are provided at three places in the component for a vehicle 1, i.e., at left and right corners below the lens holder 4, and at an upper center portion. Since these three places have basically the same structure, the screw fastening structure located on the upper center portion is shown in FIG. 2 and FIG. 3, and the structure thereof will be described.

Figure 2:
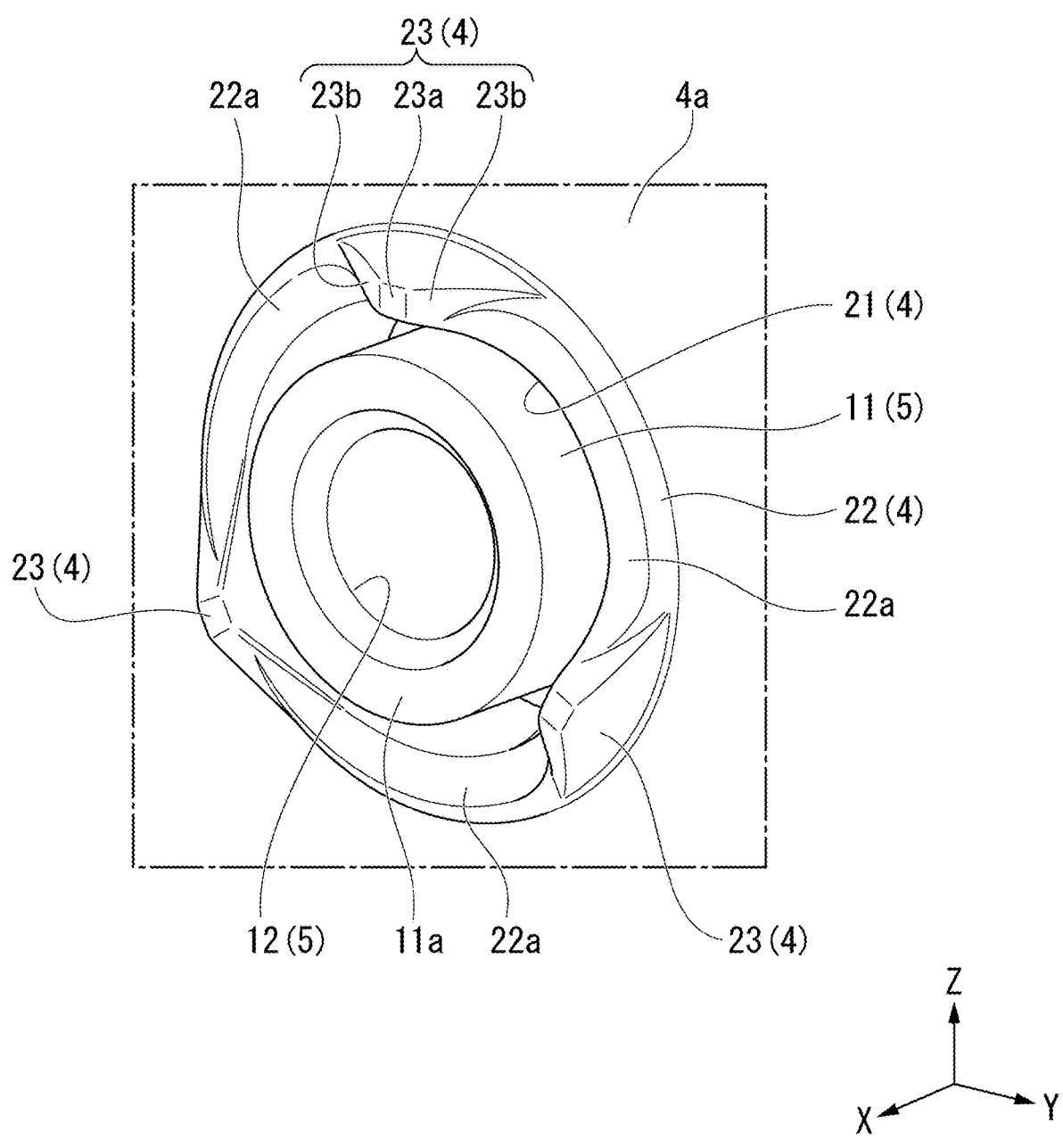
FIG. 2 is a perspective view showing a state before a screw is fastened in a screw fastening structure provided in the component for a vehicle shown in FIG. 1.
Figure 3:
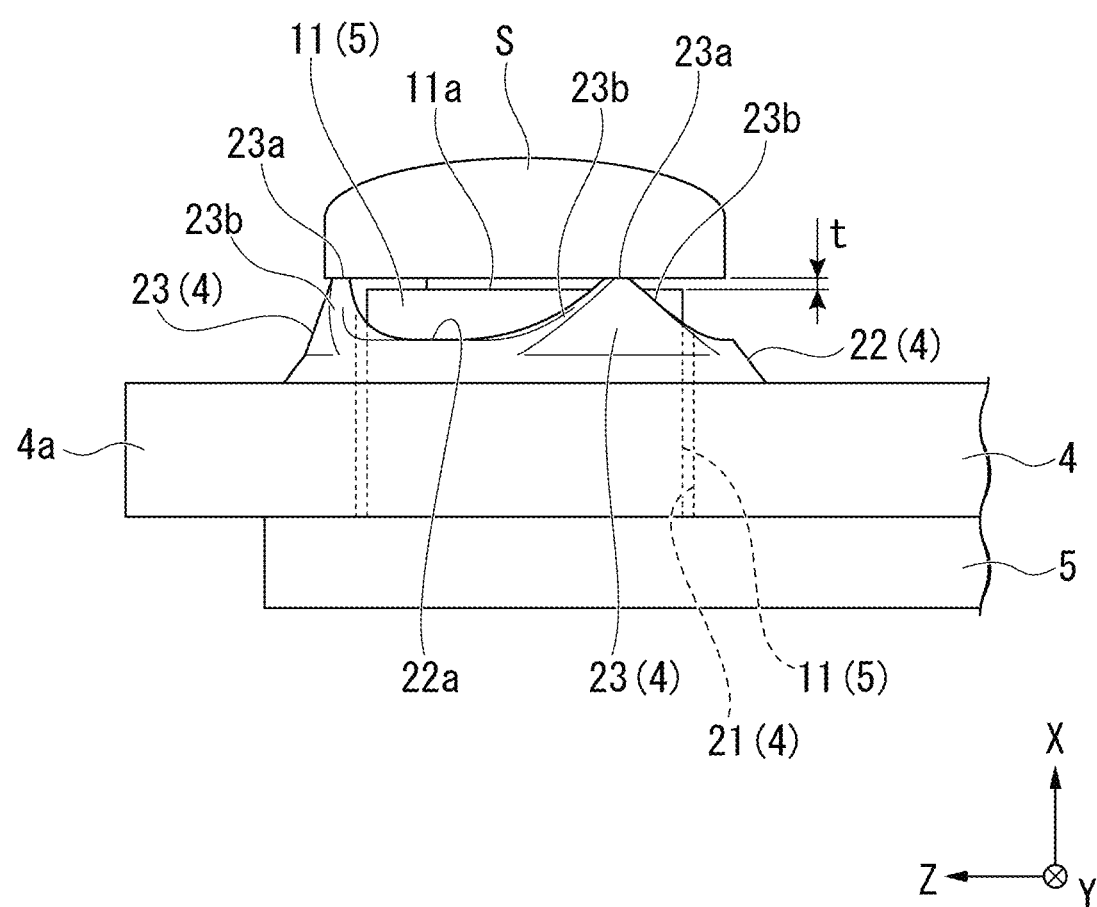
FIG. 3 is a side view showing a state in which the screw is fastened in the screw fastening structure shown in FIG. 2.

In the screw fastening structure of the embodiment, as shown in FIG. 2 and FIG. 3, the heat sink 5 has a boss 11 protruding toward the lens holder 4, and a screw hole 12 through which the screw S is screwed into a tip of the boss 11.

The boss 11 protrudes in a columnar shape from a front surface side of the heat sink 5, and a tip thereof forms a planar surface (hereinafter referred to as a seating surface) 11a.

The screw hole 12 forms a female screw portion by being bored in the depth direction from the center portion of the seating surface 11a.

On the other hand, the lens holder 4 has a through-hole 21, through which the boss 11 passes, a cylindrical part 22 protruding from a periphery of the through-hole 21 over the entire circumference, and a plurality of (in the embodiment, three) projection portions 23 disposed on a tip side of the cylindrical part 22 in parallel in the circumferential direction.

The through-hole 21 is constituted by a circular hole portion that penetrates an attachment piece 4a protruding from the periphery of the lens holder 4 in the thickness direction.

The cylindrical part 22 is provided to protrude from the periphery of the through-hole 21 toward the front surface side in a substantially cylindrical shape. In addition, the outer circumferential surface of the cylindrical part 22 forms an inclined surface, a diameter of which is gradually reduced toward the tip side. Accordingly, the cylindrical part 22 has a thickness that is greater on a base end side than on the tip side.

The plurality of projection portions 23 are disposed at a fixed interval in the circumferential direction of the cylindrical part 22. In the embodiment, the three projection portions 23 are disposed at substantially equal intervals in the circumferential direction in the cylindrical part 22. In addition, a tip of the cylindrical part 22 forms a flat surface (hereinafter, referred to as a tip surface) 22a between the projection portions 23 neighboring each other.

Each of the projection portions 23 is provided to protrude further than the tip (the seating surface 11a) of the boss 11 passing the through-hole 21 form the tip side of the cylindrical part 22. In addition, each of the projection portions 23 has a pointed shape toward its tip. Specifically, each of the projection portions 23 has a tip surface 23a abutting a head portion of the screw S upon fastening of the screw S, and a pair of inclined surfaces 23b inclined from both sides of the tip surface 23a toward the tip of the cylindrical part 22.

The tip surface 23a is constituted by a planar surface or a curved surface formed in a convex shape. The pair of inclined surfaces 23b are provided to be inclined in opposite directions to each other to be continuously connected with a tip surface 22a of the cylindrical part 22.

Further, the projection portions 23 are not limited to this shape, but can be formed by appropriately changing, for example, the width of the tip surface 23a, the width or angle (gradient) of the inclined surfaces 23b, or the like. In addition, the number, disposition, or the like, of the projection portions 23 may be changed as appropriate.

In the screw fastening structure of the embodiment having the above-mentioned configuration, as shown in FIG. 3, first, in a state in which the boss 11 passes through the through-hole 21, the lens holder 4 and the heat sink 5 are butted against each other.

Here, each of the projection portions 23 protrudes further than the seating surface 11a of the boss 11 by a predetermined height dimension t. The height dimension t is preferably, for example, about 0.1 to 0.3 (0.2±0.1) mm.

Next, from this state, the male screw portion of the screw S is screwed into the screw hole 12. In addition, when the head portion of the screw S abuts (seats on) the seating surface 11a of the boss 11, the head portion of the screw S is fastened in a state in which the tip sides of the plurality of projection portions 23 are crushed by the height dimension t.

Here, at least the tip side of each of the projection portions 23 is plastically deformed, and the cylindrical part 22 is elastically deformed. In addition, stress is distributed from each of the projection portions 23 toward the cylindrical part 22.

Accordingly, in the screw fastening structure of the embodiment, since the head portion of the screw S abutting (seating on) the seating surface 11a of the boss 11 crushes the tip sides of the plurality of projection portions 23 upon the above mentioned fastening of the screw S, the lens holder 4 becomes a state in which the lens holder 4 is strongly pressed against the heat sink 5 by the head portion of the screw S via the plurality of projection portions 23.

In addition, an elastic force (repulsive force) is generated in the axial direction of the screw S by elastically deforming the cylindrical part 22 upon the above mentioned fastening of the screw S, and the tip side of each of the projection portions 23 becomes a state in which the tip side of each of the projection portions 23 is strongly pressed against the head portion of the screw S.

Further, in the screw fastening structure of the embodiment, since the above mentioned three projection portions 23 are disposed at substantially equal intervals in the circumferential direction of the cylindrical part 22, the tip side of each of the projection portions 23 can be evenly pressed against the head portion of the screw S.

As described above, in the screw fastening structure of the embodiment, the fastening force of the screw S can be maintained for a long time. Accordingly, in the component for a vehicle 1 including the screw fastening structure of the embodiment, it is possible to prevent a decrease in the fastening force of the screw S and occurrence of rattling between the lens holder 4 and the heat sink 5 due to occurrence of the high temperature/low temperature cycle or creep as time passes.

Further, the present invention is not particularly limited to the embodiment and various modifications may be made without departing from the scope of the present invention.

For example, while the structure in which the heat sink 5 that is the above mentioned first member and the lens holder 4 that is the second member are fastened using the plurality of screws S has been exemplified in the embodiment, when the first member and the second member that constitute the component for a vehicle are fixed through fastening of the screw, the fastening structure of the present invention can be widely applied. In addition, even when the component for a vehicle is attached to the inner side of the lighting body, the screw fastening structure of the present invention can be widely applied.

In addition, in the screw fastening structure to which the present invention is applied, the first member and the second member that constitute the component for a vehicle may be fastened with a separate member sandwiched therebetween.

In addition, the first member may be any material as long as it has a higher yield point than the second member, and may be made of a resin material that has a higher yield point than the second member in addition to the above-mentioned metal material.

What is claimed is:

1. A screw fastening structure, comprising:
a first member and a second member,
wherein the first member includes a boss protruding toward the second member and a screw hole into which a screw is screwed on a tip of the boss,
the second member includes a through-hole through which the boss passes, a cylindrical part protruding from a periphery of the through-hole over the entire circumference, and a plurality of projection portions disposed on a tip side of the cylindrical part in a circumferential direction and protruding further than the tip of the boss passing through the through-hole, and
when the screw is screwed into the screw hole and a head portion of the screw abuts the tip of the boss, the head portion of the screw is fastened in a state in which the tip sides of the plurality of projection portions are crushed.

2. The screw fastening structure according to claim 1, wherein, upon fastening of the screw, at least the tip side of the projection portion is plastically deformed, and the cylindrical part is elastically deformed.

3. The screw fastening structure according to claim 1, wherein the plurality of projection portions are disposed having intervals in a circumferential direction of the cylindrical part.

4. The screw fastening structure according to claim 1, wherein the projection portion has a shape pointed toward a tip thereof.

5. The screw fastening structure according to claim 4, wherein the projection portion has a tip surface that abuts with the head portion of the screw, and a pair of inclined surfaces inclined from both sides of the tip surface toward the tip of the cylindrical part.

6. The screw fastening structure according to claim 1, wherein three projection portions are disposed in the circumferential direction of the cylindrical part as the plurality of projection portions.

7. The screw fastening structure according to claim 1, wherein the first member is formed of a material having a yield point higher than that of the second member.

8. The screw fastening structure according to claim 7, wherein the first member is formed of a metal material, and the second member is formed of a resin material.

9. A component for a vehicle comprising the screw fastening structure according to claim 1.

* * * * *